US011323427B2

(12) United States Patent
Rydkin

(10) Patent No.: US 11,323,427 B2
(45) Date of Patent: May 3, 2022

(54) MIXED-MODE CLOUD ON-PREMISE SECURE COMMUNICATION

(71) Applicant: Carrier Corporation, Jupiter, FL (US)

(72) Inventor: Maxim Rydkin, Penfield, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 395 days.

(21) Appl. No.: 16/465,474

(22) PCT Filed: Dec. 1, 2017

(86) PCT No.: PCT/US2017/064228
§ 371 (c)(1),
(2) Date: May 30, 2019

(87) PCT Pub. No.: WO2018/102692
PCT Pub. Date: Jun. 7, 2018

(65) Prior Publication Data
US 2020/0228350 A1 Jul. 16, 2020

Related U.S. Application Data

(60) Provisional application No. 62/429,336, filed on Dec. 2, 2016.

(51) Int. Cl.
H04L 29/06 (2006.01)
H04L 9/32 (2006.01)
(Continued)

(52) U.S. Cl.
CPC ............ *H04L 63/08* (2013.01); *H04L 9/3268* (2013.01); *H04L 63/102* (2013.01);
(Continued)

(58) Field of Classification Search
CPC ..... H04L 63/08; H04L 63/102; H04L 9/3268; H04W 12/069; H04W 12/08
See application file for complete search history.

(56) References Cited

U.S. PATENT DOCUMENTS 7,970,830 B2   6/2011  Staggs et al.
8,204,717 B2   6/2012  Mclaughlin et al.
(Continued)

FOREIGN PATENT DOCUMENTS

CN    104378337 A    2/2015
WO    2016137397 A2  9/2016

OTHER PUBLICATIONS

Teklemariam Tsegay Tesfay et al., Cyber-secure Communication Architecture for Active Power Distribution Networks, Mar. 2014, ACM, pp. 545-552. (Year: 2014).*
(Continued)

*Primary Examiner* — Jahangir Kabir
*Assistant Examiner* — Fahimeh Mohammadi
(74) *Attorney, Agent, or Firm* — Cantor Colburn LLP

(57) ABSTRACT

A method and apparatus for mixed-mode cloud/on-premise secure communication. The method includes commissioning an on-premise device, and connecting to web address via a client web browser using a name and a log in credential of a user; and verifying a login credential of a user at a cloud-based service and establishing communication with the client web browser if the login credential is authenticated, then permitting communication between the client web browser and the cloud based service.

17 Claims, 7 Drawing Sheets

(51) Int. Cl.
*H04W 12/08* (2021.01)
*H04W 12/069* (2021.01)
*H04W 12/088* (2021.01)

(52) U.S. Cl.
CPC ......... *H04W 12/069* (2021.01); *H04W 12/08* (2013.01); *H04W 12/088* (2021.01)

(56) References Cited

U.S. PATENT DOCUMENTS

| | | | |
|---|---|---|---|
| 8,296,178 | B2 | 10/2012 | Hudis et al. |
| 8,473,619 | B2 | 6/2013 | Baum et al. |
| 8,504,609 | B2 | 8/2013 | Mansoor et al. |
| 8,514,868 | B2 | 8/2013 | Hill |
| 8,527,549 | B2 | 9/2013 | Cidon |
| 8,555,381 | B2 | 10/2013 | Mclaughlin et al. |
| 8,584,221 | B2 | 11/2013 | Mazur et al. |
| 8,726,348 | B2 | 5/2014 | Patel et al. |
| 8,769,622 | B2 | 7/2014 | Chang et al. |
| 8,806,593 | B1 | 8/2014 | Raphel et al. |
| 8,826,451 | B2 | 9/2014 | Blubaugh |
| 8,910,278 | B2 | 12/2014 | Davne et al. |
| 9,137,304 | B2 | 9/2015 | Novotny |
| 9,172,766 | B2 | 10/2015 | Narasimhan et al. |
| 9,197,419 | B1 | 11/2015 | Chandrasekhar et al. |
| 9,218,000 | B2 | 12/2015 | Mclaughlin et al. |
| 9,219,753 | B2 | 12/2015 | Fleischman et al. |
| 9,246,839 | B2 | 1/2016 | Banatwala et al. |
| 9,253,252 | B2 | 2/2016 | Agarwal et al. |
| 9,300,644 | B1 | 3/2016 | Dubey et al. |
| 9,313,189 | B2 | 4/2016 | Tankov et al. |
| 9,319,395 | B2 | 4/2016 | Forster et al. |
| 9,354,983 | B1 | 5/2016 | Yenamandra et al. |
| 9,363,243 | B2 | 6/2016 | Cooley |
| 9,426,155 | B2 | 8/2016 | Chao et al. |
| 10,447,683 | B1* | 10/2019 | Loladia ................. H04W 12/63 |
| 2007/0056025 | A1* | 3/2007 | Sachdeva ............ H04L 63/0853 726/5 |
| 2009/0300152 | A1 | 12/2009 | Ferris |
| 2011/0047204 | A1* | 2/2011 | Mansoor ............... G06F 16/972 709/202 |
| 2011/0055277 | A1* | 3/2011 | Resch .................... H04L 63/20 707/785 |
| 2012/0011578 | A1* | 1/2012 | Hinton .................. H04L 9/3228 726/8 |
| 2012/0072728 | A1* | 3/2012 | Teather .................. H04L 67/10 713/171 |
| 2012/0110650 | A1* | 5/2012 | Van Biljon ............ G06Q 40/00 726/4 |
| 2012/0179802 | A1* | 7/2012 | Narasimhan ........ H04L 41/0806 709/223 |
| 2013/0014239 | A1* | 1/2013 | Pieczul ................... G06F 21/41 726/7 |
| 2013/0142201 | A1 | 6/2013 | Kim et al. |
| 2013/0166711 | A1 | 6/2013 | Wang et al. |
| 2014/0164779 | A1* | 6/2014 | Hartley ................. H04L 9/0866 713/176 |
| 2014/0167928 | A1 | 6/2014 | Burd et al. |
| 2014/0196022 | A1 | 7/2014 | Skutin et al. |
| 2014/0280334 | A1 | 9/2014 | Leblanc |
| 2014/0335480 | A1 | 11/2014 | Asenjo et al. |
| 2015/0012751 | A1* | 1/2015 | Forster ................. H04L 63/029 713/171 |
| 2015/0100547 | A1 | 4/2015 | Holmes-Higgin et al. |
| 2015/0142587 | A1 | 5/2015 | Salgar et al. |
| 2015/0172321 | A1 | 6/2015 | Kirti et al. |
| 2015/0341445 | A1* | 11/2015 | Nikolov ................ G06F 9/5072 709/203 |
| 2015/0363228 | A1 | 12/2015 | Bhat |
| 2015/0372982 | A1* | 12/2015 | Herle .................. H04L 63/0272 726/15 |
| 2016/0036857 | A1 | 2/2016 | Foxhoven et al. |
| 2016/0072789 | A1 | 3/2016 | Loo |
| 2016/0134686 | A1 | 5/2016 | Youker et al. |
| 2016/0156661 | A1 | 6/2016 | Nagaratnam et al. |
| 2016/0156664 | A1 | 6/2016 | Nagaratnam et al. |
| 2016/0205078 | A1* | 7/2016 | James ..................... H04L 9/006 713/171 |
| 2016/0224357 | A9 | 8/2016 | Hill et al. |
| 2016/0240074 | A1 | 8/2016 | Probin et al. |
| 2016/0241509 | A1* | 8/2016 | Akcin .................... H04L 67/10 |
| 2016/0241596 | A1 | 8/2016 | Overby, Jr. et al. |
| 2016/0267286 | A1 | 9/2016 | Kodeswaran et al. |
| 2016/0269257 | A1 | 9/2016 | Abuelsaad et al. |
| 2017/0063967 | A1* | 3/2017 | Kitchen ................. H04L 67/02 |

OTHER PUBLICATIONS

D. Rotondi et al., Managing Access Control for Things: a Capability Based Approach, Feb. 2012, ACM, pp. 263-268. (Year: 2012).*

Siamak Azodolmolky et al., Cloud Computing Networking: Challenges and Opportunities for Innovations, Jul. 12, 2013, IEEE, vol. 51, Issue: 7, pp. 54-62. (Year: 2013).*

Sasko Ristov et al., Security Evaluation of Open Source Clouds, Oct. 10, 2013, IEEE, pp. 73-80. (Year: 2013).*

International Search Report and Written Opinion for application PCT/US2017/064228, 14 pages.

* cited by examiner

MIXED-MODE CLOUD ON-PREMISE SECURE COMMUNICATION

BACKGROUND

The subject matter disclosed herein generally relates to security and access control solution, video processing, and cloud computing and, more particularly, to mixed-mode cloud/on-premise secure communication as applied to access control and security management solutions.

On-premise software delivery model is a model of software deployment that involves an enterprise to purchase hardware such as servers, to invest capital into software licenses, to invest into dedicated IT staff for maintenance and support, etc. On-premise is the traditional model of software deployment where enterprises deploy applications in-house, e.g., on the premises of the enterprise. The initial investment for the on-premise computing infrastructure is typically high, but may pay off long term. One advantage of the on-premise model is that the enterprise has control over the systems and data. On-premise platforms are considered more secure than cloud platforms as corporate data is stored and handled internally, e.g., within an internal private network.

Cloud computing is a widely adopted and evolving concept. Generally, cloud computing refers to a model for enabling ubiquitous, convenient, and on-demand access via Internet to shared pools of configurable computing resources such as networks, servers, storages, applications, functionalities, and the like. There are a number of benefits associated with cloud computing for both the providers of the computing resources and their customers. For example, customers may develop and deploy various business applications on a cloud infrastructure supplied by a cloud provider without the cost and complexity to procure and manage the hardware and software necessary to execute the applications. The customers do not need to manage or control the underlying cloud infrastructure, e.g., including network, servers, operating systems, storage, etc., but still have control over the deployed applications. On the other hand, the provider's computing resources are available to provide multiple customers with different physical and virtual resources dynamically assigned and reassigned according to clients' load. Further, cloud resources and applications are accessible via the Internet.

Generally security and access control solutions are implemented as software solutions installed and maintained on local, on-premise servers and computers. These solutions may be expensive for smaller enterprises to acquire and maintain. For larger enterprises, it may be too burdensome to maintain the on-premise solutions required. Accordingly, there exists a desire to provide a method and system that can help relieve some of the cost associated with on-premise security solutions through the use of, for example, some form of cloud computing.

SUMMARY

According to one embodiment, In addition to one or more of the features described above, or as an alternative, further embodiments of the method include a method for mixed-mode cloud/on-premise secure communication. The method including commissioning an on-premise device, connecting to web address via a client web browser using the first name and a log in credential of a user, and verifying the login credential of the user at the cloud-based service and establishing communication with the client web browser if the login credential is authenticated and permitting communication between the client web browser and the cloud based service.

In addition to one or more of the features described above, or as an alternative, further embodiments may include that the commissioning includes generating a set of cryptographic keys, connecting to a cloud-based service from a first network address using a first name and transmitting on-premise device information to the cloud-based service, and generating at the cloud-based service a unique name/pseudonym for the on-premise device. The commissioning also includes resolving with an accessible DNS service the unique name/pseudonym to a network address for the cloud-based service and transmitting the unique name to the on-premise device, generating with the on-premise device a certificate signing request (CSR) based on the unique name/pseudonym the cryptographic keys, and transmitting the CSR to the cloud-based service, requesting a digital certificate using the CSR from a trusted certification authority (CA) and receiving the digital certificate once the CA issues the digital certificate, and transmitting the digital certificate to the on-premises device, and configuring on-premises device to use the digital certificate.

In addition to one or more of the features described above, or as an alternative, further embodiments may include attempting to connect to an on-premise device with the client web browser to complete a user request, cryptographically transmitting from the cloud-based service to the client web browser the information associated with the user relevant to the on-premise device, and redirecting the client web browser to a network address associated with the unique name/pseudonym employed during the commissioning. Moreover, the further embodiments may also include attempting to connect with the client web browser to the unique name/pseudonym and conducting domain name resolution (DNS) to resolve and identify an IP address for the on-premise device if the IP address is not known, connecting to the resolved IP address with the client browser and transmitting information associated with the user relevant to the on-premise device, to the on-premises device, transmitting the digital certificate issued to on-premises device during the commissioning to the client web browser, and cryptographically validating the digital certificate with the client web browser; and cryptographically validating data/claims/rights from the information associated with the user relevant to the on-premise device with on-premises device and permitting the user request, if data/claims/rights allow it.

In addition to one or more of the features described above, or as an alternative, further embodiments may include storing information associated with the user relevant to the on-premise device in the client browser.

In addition to one or more of the features described above, or as an alternative, further embodiments may include the on-premise device requesting the information associated with the user relevant to the on-premise device from the client browser.

In addition to one or more of the features described above, or as an alternative, further embodiments may include that the information associated with the user relevant to the on-premise device includes at least one of rights, security claims, licensed feature information, user name, expiration dates, and server data.

In addition to one or more of the features described above, or as an alternative, further embodiments may include that the information is provided as URL parameters or HTTP headers.

In addition to one or more of the features described above, or as an alternative, further embodiments may include generating a result based on the user request.

In addition to one or more of the features described above, or as an alternative, further embodiments may include storing the result in the client browser. Furthermore, even storing the result as an HTTP cookie.

In addition to one or more of the features described above, or as an alternative, further embodiments may include that the on-premise device is part of at least one of a security system, an access control system a fire suppression system or an HVAC system or an elevator control system.

In addition to one or more of the features described above, or as an alternative, further embodiments may include that the first name is preprogrammed into the on-premise device.

In addition to one or more of the features described above, or as an alternative, further embodiments may include that the certification authority is an independent third party.

In addition to one or more of the features described above, or as an alternative, further embodiments may include that the unique name is unique to the service provider.

Also described herein in an embodiment is a system for mixed-mode cloud/on-premise secure communication. The system including an on-premise device commissioned to provide secure communication with a cloud based system; wherein the commissioning includes the on-premise device generates a set of cryptographic keys, a cloud-based service connecting to a first network address using a first name and transmitting on-premise device information to the cloud-based service, the cloud based service generating a unique name/pseudonym for the on-premise device, and a publically available DNS resolving the unique name/pseudonym to a network address for the cloud-based service and transmitting the unique name to the on-premise device. The system also includes the on-premise device generating a certificate signing request (CSR) based on the unique name/pseudonym the cryptographic keys, and transmits the CSR to the cloud-based service, the cloud-based service requesting a digital certificate using the CSR from a trusted certification authority (CA) and receives the digital certificate once the CA issues the digital certificate, and transmits the digital certificate to the on-premises device, and the on-premises device being configured to use the digital certificate. The system also includes a client web browser connecting to web address using the first name and a log in credential of a user; and the cloud based service verifying the login credential of the user and establishes communication with the client web browser if the login credential is authenticated and permits communication between the client web browser and the cloud based service.

In addition to one or more of the features described above, or as an alternative, further embodiments may include that the client web browser attempting to connect to an on-premise device to complete a user request, the cloud-based service cryptographically transmitting the information associated with the user relevant to the on-premise device to the client web browser on-premise; and the client web browser being redirected to a network address associated with the unique name/pseudonym employed during the commissioning. Moreover further embodiments may include the client web browser attempting to connect with to the unique name/pseudonym and conducting domain name resolution (DNS) to resolve and identify an IP address for the on-premise device if the IP address is not known, the client browser connecting to the resolved IP address with and transmitting information associated with the user relevant to the on-premise device, to the on-premises device, the on-premises device transmitting the digital certificate issued during the commissioning to the client web browser, and cryptographically validating the digital certificate with the client web browser; and the on-premises device cryptographically validating data/claims/rights from the information associated with the user relevant to the on-premise device and permitting the user request, if data/claims/rights allow it.

In addition to one or more of the features described above, or as an alternative, further embodiments may include the client browser storing information associated with the user relevant to the on-premise.

In addition to one or more of the features described above, or as an alternative, further embodiments may include the on-premise device requesting the information associated with the user relevant to the on-premise device from the client browser.

In addition to one or more of the features described above, or as an alternative, further embodiments may include that the information associated with the user relevant to the on-premise device includes at least one of rights, security claims, and licensed feature information, user name, expiration dates, and server data.

In addition to one or more of the features described above, or as an alternative, further embodiments may include that the information is provided as URL parameters or HTTP headers.

In addition to one or more of the features described above, or as an alternative, further embodiments may include the on-premise device generating a result based on the user request.

In addition to one or more of the features described above, or as an alternative, further embodiments may include the client browser storing the result browser as an HTTP cookie.

In addition to one or more of the features described above, or as an alternative, further embodiments may include that the on-premise device is part of at least one of a security system, an access control system a fire suppression system or an HVAC system or an elevator control system.

In addition to one or more of the features described above, or as an alternative, further embodiments may include that the first name is preprogrammed into the on-premise device.

In addition to one or more of the features described above, or as an alternative, further embodiments may include that the certification authority is an independent third party.

In addition to one or more of the features described above, or as an alternative, further embodiments may include that the unique name is unique to the service provider.

Also described herein in another embodiment is a computer program product to configure mixed-mode cloud/on-premise secure communication, the computer program product comprising a computer readable storage medium having program instructions embodied therewith, the program instructions executable by one or more processors to cause the processors to implement the methodologies described herein.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
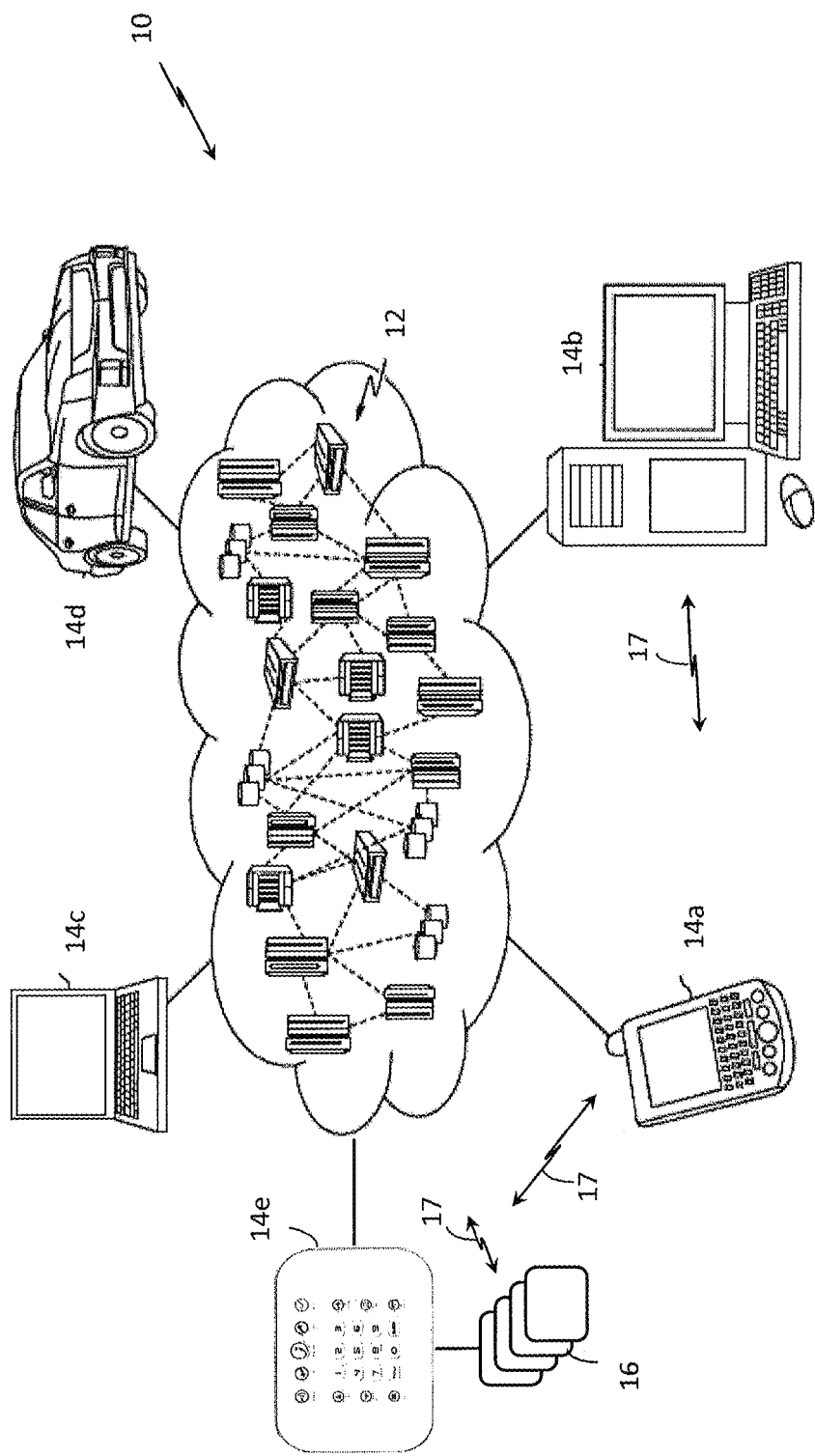
FIG. 1 depicts a cloud computing environment in accordance with one or more exemplary embodiments.

An enterprise may select either to run an application fully on-premise or fully on a cloud platform. However, there are advantages and disadvantages with both cloud and on-premise platforms. Issues related to security and compliance of cloud platforms may be one disadvantage. On the other hand, for on-premise platforms the cost may be a disadvantage. Since the initial investment in on-premise infrastructure may be high, an enterprise that has already invested in on-premise platforms may prefer gradual adoption of cloud platforms, if at all, in order to maximize return and protect their initial investments. An enterprise may desire a suite of security management applications that is cloud based for its flexibility and lower implementation cost, yet with the functionality and security of an on-premise application. Therefore, a hybrid software delivery model may bring more value to such enterprises.

The hybrid delivery model is a mixed model between on-premise based applications and cloud based applications, e.g., on-demand. For example, in the case where an application operates on an on-premise platform with sensitive data, such data may be undesirable to be stored on a cloud platform and accessed via the Internet In such a case, a hybrid software delivery may be used where cloud services can be consumed by applications operating on an on-premise platform. An application operable to be deployed and run on both on-premise and cloud platforms, with little or no modification of the original source code of the application, is referred herein as a hybrid application. For example, a hybrid application may be deployed and/or run on an on-premise platform, and consume services or other resources provided by a cloud platform (e.g., public or virtual private cloud). Further, a hybrid application may be deployed and/or run on a cloud platform and consume resources of an on-premise platform such as a backend system. Another situation where hybrid software delivery model may be appropriate is when enterprises prefer to run their existing on-premise applications on a cloud platform. For example, business applications running and operating on-premise at one point may be extended or migrated towards a cloud platform, for example, to consume functionality and modern development environment and models provided by the cloud platform. However, to enable an application operating on-premise to operate on cloud, the enterprise may have to incur costs comparable to develop a new application resulting in worse protection for on-premise investments. Also, when an application is migrated to the cloud platform, two versions of the application may have to be maintained for the on-premise and the cloud platform, increasing maintenance costs for the application.

Enterprises applying either on-premise or cloud software delivery model usually may have to balance between security and costs. The communication between customers and the applications and on-premise and cloud devices must be secured. Communications are typically secured using standards-based approaches, such as transport-layer security (TLS). However, the application of TLS is hampered by more difficult and cumbersome implementation. For example with TLS, there is no simple way to acquire signing certificates, and a lack of consistent naming for network hosts mandates significant coordination with internal information technology (IT) personnel. In addition to transport security, providers delivering the on-premise and hybrid applications for customer enterprise solutions demand tamper-proof licensing which is difficult to achieve with hardware or virtual servers being under control of the customer.

Therefore, what would benefit an enterprise is for users to seamlessly access the cloud-based and on-premise applications in the secure fashion after first authenticating against the cloud based applications. To implement such a scheme, disclosed herein in an embodiment is a hybrid solution that provides a cloud hosted application with the functionality to provide: a launcher user interface; users and authorization management, network name resolution (Domain Name System resolution (DNS)) for on-premise servers and modules; web-based single-sign-on/federated identity provider; digital certificate issuance; and licensing management. The hybrid solution would also provide an on-premise "gateway" application with the functionality to provide an ability to register a unique name, capabilities, and network address with the above-mentioned cloud application, ability to validate the credential information provided by the cloud application.

Embodiments described herein are directed access control security management solutions implemented in a hybrid cloud/on-premise solution with secure communications. One or more embodiments as disclosed herein provide a simplified scheme for ensuring secure communication between an on-premise device and applications and cloud based applications without significant impact or on-premise configuration. Advantageously in on or more embodiments the method described enables secure communications with tamper-proof licensing, centralized authorization management and multi-tenancy and enables gradual path to entirely cloud hosted solution and yet avoids the need for a secure tunnel and specialized interfaces and programming.

According to one or more embodiments, implementing a cloud computing mixed mode cloud/on-premise secure communications solution can provide advantages such as secure communication, network host name resolution, network transport layer security, authentication authorization, and licensing. It should be appreciated that while the embodiments are described herein with reference to a security and access control solutions, these descriptions are for illustration only and should not be considered limiting. The described embodiments are readily applicable to any application where a mixed cloud/on-premise solution is desirable and secure communications would be advantageous. For example, the embodiments disclosed herein may be equally suitable for applications security, access control solutions, fire suppression systems, heating, ventilation, and cooling (HVAC) and elevator control systems.

It is understood in advance that although this disclosure includes a detailed description on cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, an illustrative cloud computing environment 10 is depicted. As shown, cloud computing environment 10 comprises one or more cloud computing nodes 12 with which on-premise computing devices 14a-e may communicate. The on-premise computing devices 14a-e are generally connected to an on-premise local area network (LAN) 17, wide area network (WAN) or cellular, and the like to facilitate communication with a the cloud computing nodes 12. For example, the on-premise computing devices could be, a personal digital assistant (PDA) or cellular telephone 14a, desktop computer/terminal/server 14b, laptop computer 14c, a vehicle 14d, or a security or access control panel 14e. Computing devices 14a-e may also be configured to communicate with each other or a variety of sensors 16. The communication with other computing devices 14a-e or sensors 16 could be wired or wireless as needed. The communication could also be via a Local Area Network (LAN) if desired as depicted by arrows 17. Cloud computing nodes 12 may communicate with one another and/or be grouped (not shown) physically or virtually, in one or more networks, such as Private, Community, Public, or Hybrid clouds as described above, or in one or more combinations thereof. This allows cloud computing environment 10 to offer infrastructure, platforms and/or software as services for which a cloud consumer does not need to maintain or minimize resources at a local computing device level. It is understood that the types of computing devices 14 shown in FIG. 1 are intended to be illustrative only and that computing nodes 12 and cloud computing environment 10 can communicate with any type of computerized device over any type of network and/or network addressable connection (e.g., using a web browser).

Figure 2:
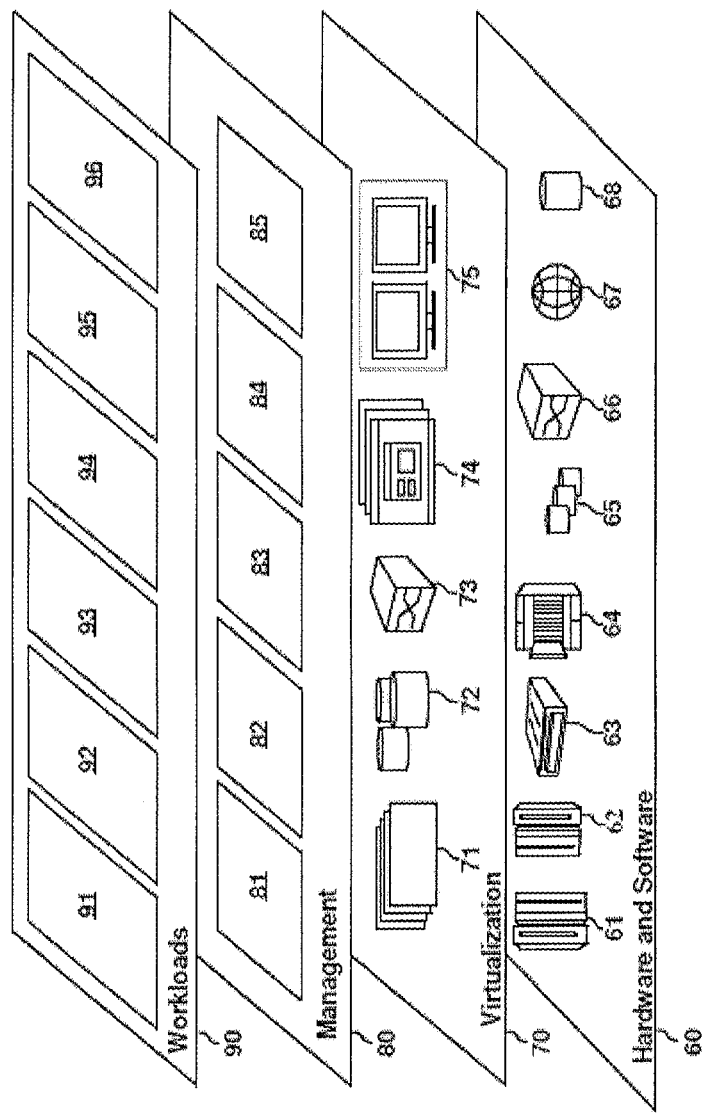
FIG. 2 depicts abstraction model layers in accordance with one or more exemplary embodiments.

Referring now to FIG. 2, a set of functional abstraction layers provided by cloud computing environment 10 (FIG. 1) is shown. It should be understood in advance that the components, layers, and functions shown in FIG. 2 are intended to be illustrative only and embodiments are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing of messages across multiple communication systems 96.

In accordance with the various embodiments of the disclosure, methods, systems and computer program products for providing a security management solution with a secure communication in a mixed mode cloud/on-premise environment are provided. In one or more exemplary embodiments as disclosed herein a simplified scheme for ensuring secure communication between the on-premise application and cloud based applications without significant impact or on-premise configuration. According to one or more embodiments, implementing a cloud computing mixed mode cloud/on-premise security management solution system can provide advantages such as secure communication, network host name resolution, network transport layer security, authentication authorization, and licensing.

Figure 3:
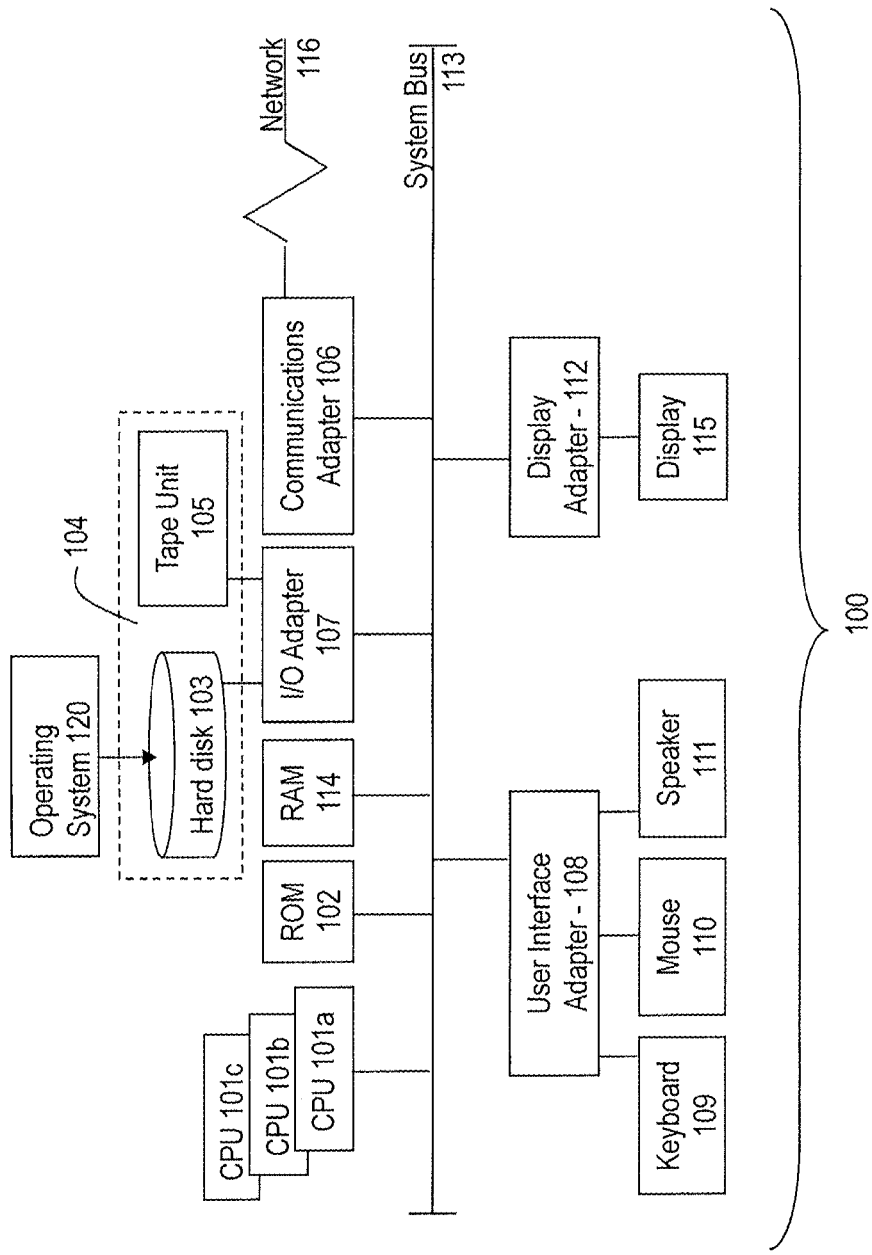
FIG. 3 is a block diagram illustrating one example of a processing system for practice of the teachings herein in accordance with one or more exemplary embodiments.

Referring to FIG. 3, there is shown an embodiment of a processing system 100 for a given computing device 14 as may be employed for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3. It should be appreciate that the components of the system as described are for illustration purposes only. Features and functions as described may be omitted, integrated, or distributed as desired and as required to suit a particular application.

Figure 4:
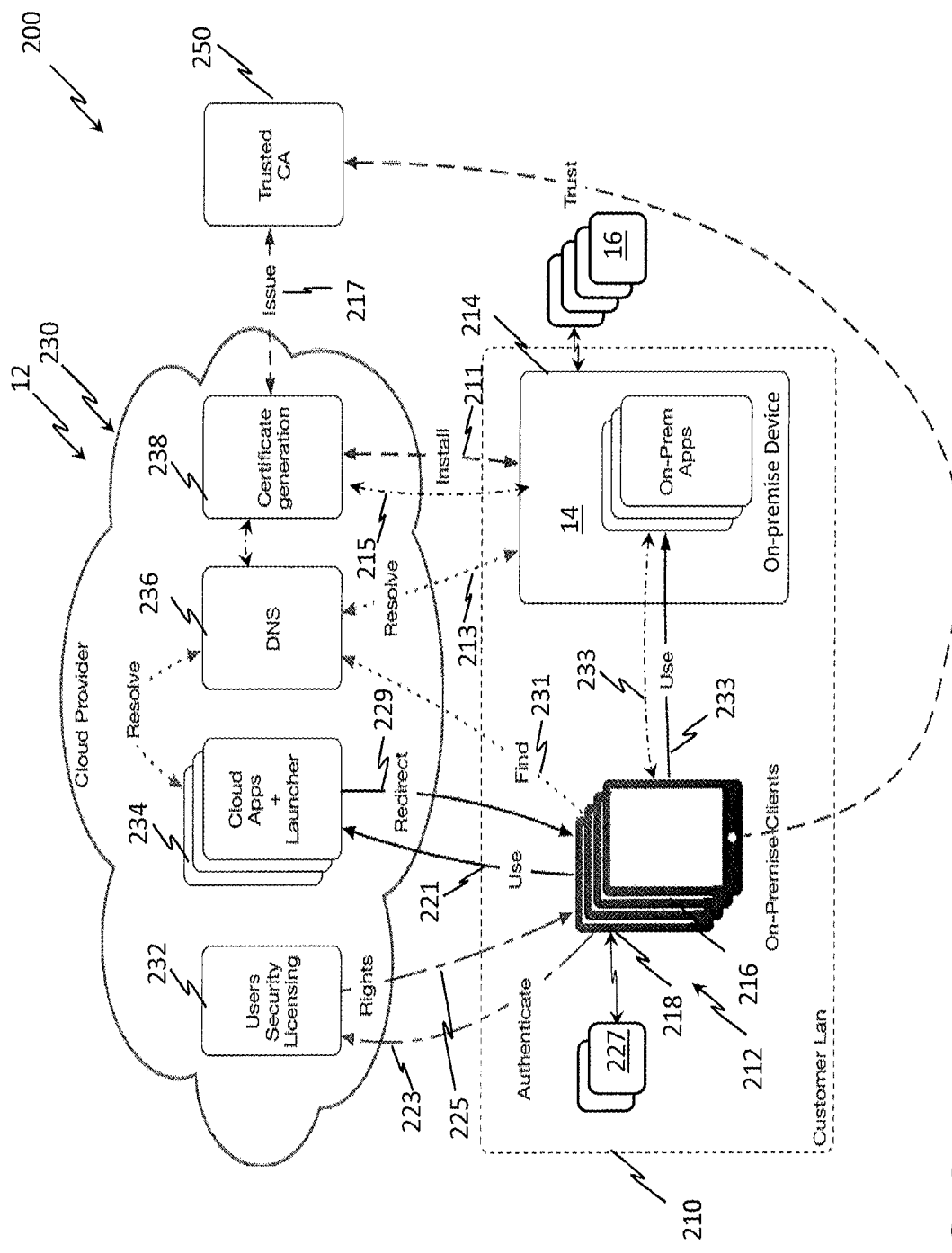
FIG. 4 illustrates a block diagram of a cloud based communications processes in accordance with one or more exemplary embodiments.

Turning now to FIG. 4, a diagram of a portion mixed-mode cloud/on-premise security management system 200 and methodology that will permit an enterprise to seamlessly access the cloud-based and on-premise applications in the secure fashion after first authenticating against the cloud based applications. In the Figure, details of the interconnection and communication between cloud based components (as depicted in FIG. 2) and on-premise components are depicted. In an embodiment the method includes a cloud based portion or functions 230 providing a Cloud Apps & Launcher UI 234, Users security licensing 232 for authorization management, secure communication network host name resolution (DNS) 236 for on-premise servers, network transport layer security authentication, authorization, i.e., web-based single-sign-on/federated identity provider, Digital Certificate generation, and Licensing management 238. The on-premise portion 210 provides an enterprise the ability to register a unique name, capabilities, and network address with the above-mentioned cloud application, ability to validate the credential information provided by the cloud application. The on-premise portion 210 of the system 200 includes one or more on-premise computing devices 14a-e (as in FIG. 1) including, but not limited to a processing system 100 or a portion thereof (as described with reference to FIG. 3). Each on-premise computing device 14, can be a security panel, control device, mobile device, server, or cloud gateway or the like. As described with respect to FIG. 1, the on-premise portion may also include sensors 16 and other devices 14 that communicate with one another. On-premise clients shown generally as 212 employ the on-premise computing devices 214 to execute applications as desired. In a security or access control application the computing device 14 may be a security or access control panel or server, and the sensors 16 might be various sensors as might be employed by the system. For example, motion sensors, occupancy sensors, door or window sensors, door reader, and the like.

Embodiments described herein are directed access control security management solutions implemented in a hybrid cloud/on-premise solution with secure communications. One or more exemplary embodiments as disclosed herein provides a simplified scheme for ensuring secure communication between the on-premise application and cloud based applications without significant impact or on-premise configuration. Advantageously in on or more embodiments the method described eliminates the need for a secure tunnel and specialized interfaces and programming to maintain secure communications with the cloud allows for tamper-proof licensing, centralized authorization management and multi-tenancy and enables gradual path to entirely cloud hosted solution.

Setup and Initialization

Figure 5:
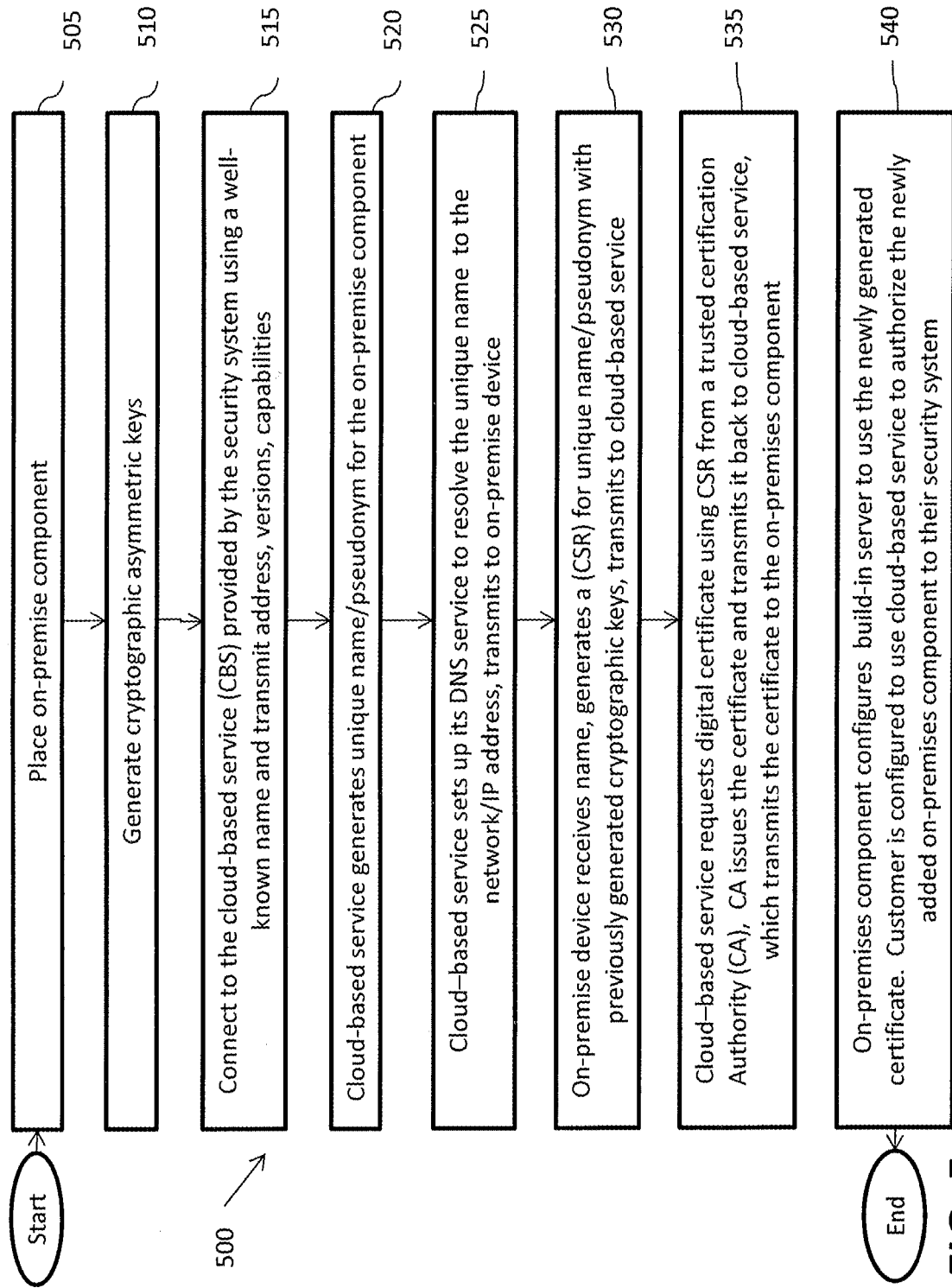
FIG. 5 illustrates a flowchart of a method for commissioning an on-premise device for mixed-mode cloud/on-premise communications in accordance with one or more exemplary embodiments.

Turning now to FIG. 5 as well, a process diagram depicting the mixed-mode cloud/on-premise security management methodology 500 is provided. In an embodiment, to facilitate the implementation and to permit an enterprise to seamlessly access the cloud-based and on-premise applications in a secure fashion, an initial set-up or commissioning is conducted to establish authentication against the cloud based applications. That is, to establish a secure communication between an on-premise device and the cloud based application. To begin, a new on-premises device 214 (device, server, or cloud gateway) of the security system 200 is placed on-premise and energized as depicted at process step 505. At process step 510 the on-premises device 214 generates a set of cryptographic asymmetric keys. These keys are generated using conventional well known processes and are saved to be used later in the process as part of the authentication to facilitate establishing the secure communication. The on-premises device 214 then connects to the cloud-based service 230 at process Certificate Generation 238 as depicted at line 211 using a well-known names (for example, "https://registration.security.lenel.com") provided by the security system 200, and transmits its network/IP address (Ex. '192.168.1.2') as well as its own firmware versions and a list of capabilities as depicted at process step 515. Typically, the well-known name(s) are programmed into the on-premise device 214 at the time of manufacturing. At process step 520, the cloud-based service Certificate Generation process 238 generates a unique name/pseudonym for the on-premise device 214 within the cloud system's name space. (e.g.: "14992568-5E09-48d2-BEB2-BE87186636FE.security.lenel.com"). The cloud-based service 230 sets up its DNS service 236 to resolve the '14992568-5E09-48d2-BEB2-BE87186636FE.security.lenel.com' name to the network/IP address (e.g., '192.168.1.2') provided by the on-premise device 214 as depicted at process step 525 and then transmits it back to the on-premises device 214 as depicted by line 237. The on-premise device 214 receives the unique name/pseudonym and then generate a digital certificate signing request (CSR) for the unique name/pseudonym with the previously generate cryptographic keys as depicted at process step 530 and transmits the CSR to the Cloud-based service 230 as depicted by line 215. At process step 535, the cloud-based service 230 at certificate generation service 238 automatically contacts a trusted third party Certification Authority (CA) 250 (Ex.: Entrust.com) and requests a new digital certificate using the provided CSR as depicted by line 217. The CA issues the certificate and transmits it back to cloud-based service 230. The cloud-based service 230 then transmits the certificate to the on-premises device 214. Finally at process step 540 the on-premise device 214 is configured to use the newly generated certificate. A customer now is configured to use cloud-based service 230 via a web page to authorize the newly added on-premises device 214 to be a part of their security or access control system 200. At this point in time the system is ready to be used with the new on-premises device 214.

User Connection

Figure 6:
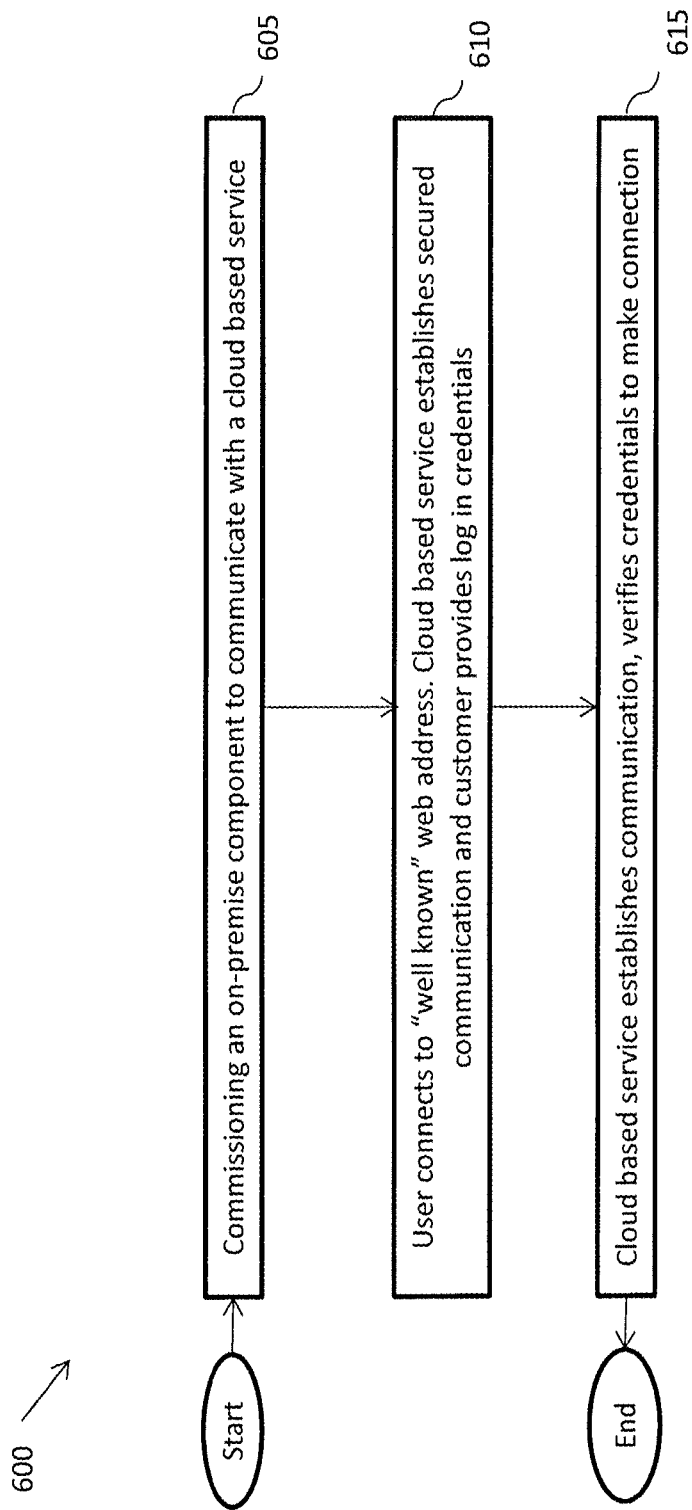
FIG. 6 illustrates a flowchart of a method of mixed-mode cloud/on-premise communications in accordance with one or more exemplary embodiments.

Turning now to FIG. 6 as well for a description of the interaction of the customer to enable providing the desired functionality of the security system 200. In FIG. 6 a process diagram depicting the mixed-mode cloud/on-premise security management methodology 600 is provided. In an embodiment, as depicted at process step 605 the commissioning process 500 as depicted in FIG. 5 and described above is completed. Then, to initiate communication, an enterprise customer that seeks to use the security or access control system 200 uses an internet web browser 216 (shown as an on-premise client) on their computer/tablet/phone/internet-capable appliance or an application making or even another, computing devices 14a-e to connect to the well-known web address identified above to gain access and begin using the security system 200 (e.g., "https://customer.security.lenel.com") as shown by line 221. Cloud-based system 230 at application and launcher 234 and client's browser 216 negotiate a TLS-secured session to verify identity and ensure security of communications. The customer then uses their username and password (or another/additional means of authentication) to prove their identity as shown by line 213 to the cloud-based system 230 at User Security Licensing service 232 as part of a standard log in where the cloud-based system 230 validates the provided credentials and, if credentials are valid, accepts the connection as depicted at process step 610. At this point, the communication between the client web browser 216 and the cloud based applications 230 has been established, as depicted at process step 615, authentication performed to authenticate the user and the cloud based applications 230 can trust providing information to the user via the client web browser 216 The customer is now able to use applications 234 of the cloud-based system 230 to perform any action they are authorized to perform.

Figure 7:
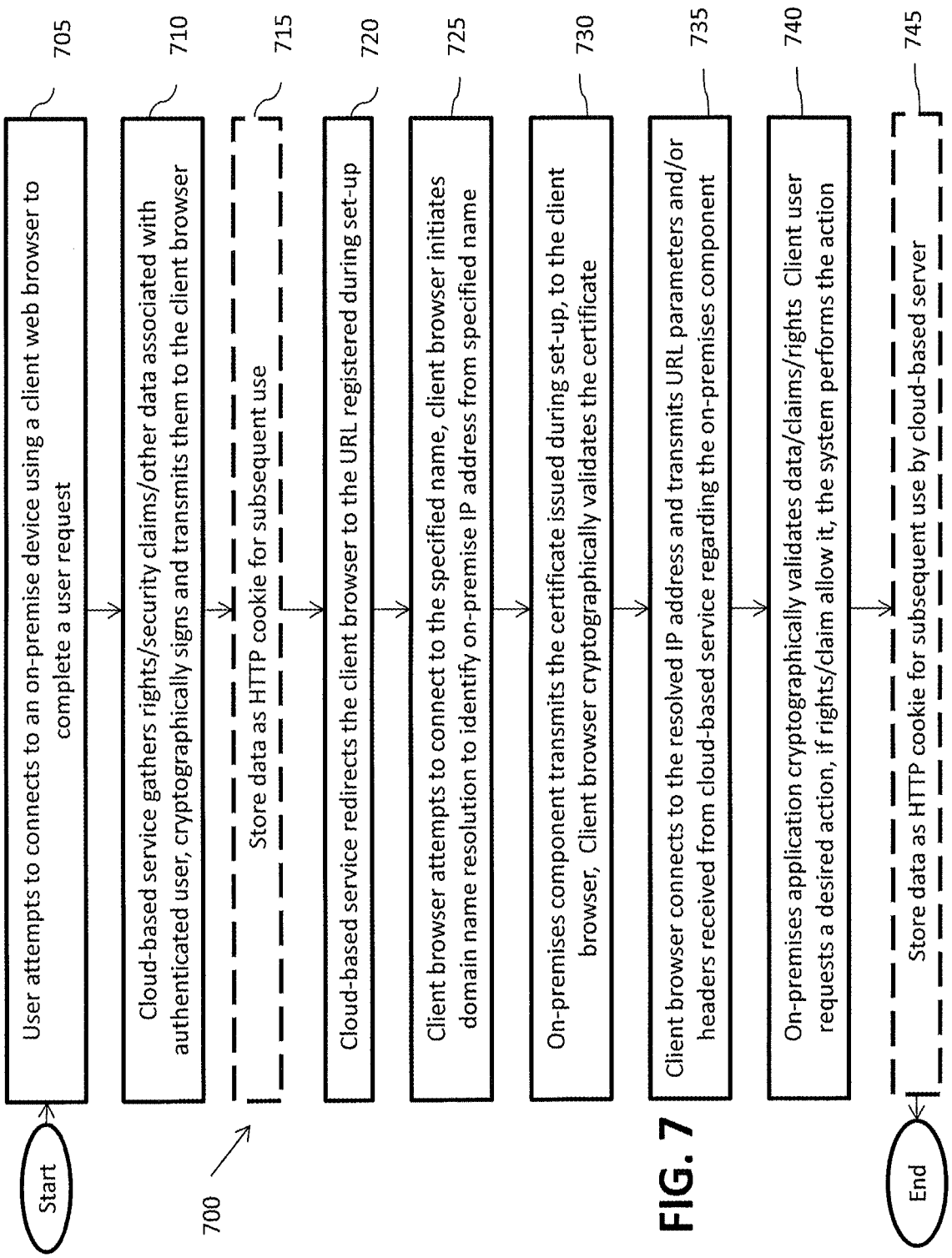
FIG. 7 illustrates a flowchart of a method of mixed-mode cloud/on-premise communications in accordance with one or more exemplary embodiments.

In an embodiment, if the customer desires to perform an action that requires an interaction with the on-premises system 210 the following additional steps are employed to establish authentication and secure communication to the on-premise device 214. Turning now to FIG. 7 as well, a flow chart depicting the process for a user to connect to an on-premise device 214 via the web browser 216 is depicted. At process step 705, a user attempts to connect to an on-premise device 214 to complete a user request, using a client web browser 216 as described above and once again depicted at lined 221. The cloud-based system 230 gathers the rights/security claims/other data that are associated with the authenticated user as described in process 600 with reference to FIG. 6, above, and are relevant to the on-premises system 210, cryptographically signs them and transmits them to the client browser 216 as depicted by line 225 and as shown in process step 710. Optionally the client browser 216 may store the information as an HTTP cookie 227 for subsequent use as depicted at process step 715.

Continuing with process step 720, the cloud-based system 230 at Launcher service 234 redirects the client browser 216 to the URL which includes the name registered during set-up (as described with reference to FIG. 5 above) and as shown by line 229. (For example ('https://14992568-5E09-48d2-BEB2-BE87186636FE.security.lenel.com/on-premises-app'). It should be noted that the cloud-based system 230 may optionally include the rights/security claims/other data as URL parameters or HTTP headers. In addition, that data may be cryptographically signed. Ultimately, the client browser 216 will now attempt to connect to the registered name as depicted at process step 725. To establish the connection, client browser 216 needs to resolve the name back to the IP address, if it is the first time the name is being used from this client, the Domain Name System (DNS) resolution needs to take place Following is the standard (rfc1034 and rfc1035) sequence of steps e.g., (https://www.ietf.org/proceedings/42/slides/nat-heffernan-slides-98aug/sld001.htm). The client browser 216 contacts local network on-premises DNS server 218. The on-premises DNS server 218 sends the request to the DNS root server (https://www.iana.org/domains/root/servers) (not shown). The root DNS server refers the on-premises DNS server 218 to the cloud-based system's DNS server 236 as depicted by line 231. The on-premises DNS server 218 sends request the cloud-based system's DNS server 236. Cloud-based system's DNS 236 server replies to the on-premises DNS server 218 with the IP address of the on-premises device 214. The on-premises DNS server 218 then replies to the client browser 216 with the completed resolution resulting IP address. Turning now to process step 730, once the address is resolved, the client browser 216 connects to the on-premises device 214 and begins negotiating TLS session to secure future transmissions. The on-premises device 214 participates in the negotiation and transmits the certificate issued to it during the set-up as described above with reference to FIG. 5 to the client browser 216 as shown by line 233. The Client browser 216 can then cryptographically validates the certificate. Once connection is established the client browser 216 communicates the URL parameters and/or headers, (commonly called claims/permissions) previously provided by the cloud-based system 230 to the on-premises device 214 as depicted at process step 735. Advantageously, the on-premises system device 214 can now optionally request access to the temporarily stored data (e.g., the information associated with the user relevant to the on-premise devise that was optionally stored or stored as a HTTP cookie.) and client browser 216 would provide it because they share same parent subdomain.

Continuing with process step 740, the on-premises application cryptographically validates the data/claims/rights came from authoritative source (cloud-based system 230). A user an then request desired action of the on-premise device 214 and, if rights/claims (provided earlier) allow it to be performed, the on-premise device 214 of security system 200 performs action requested. Optionally client web browser 216 stores the result/data in a cookie 227 to be accessed the cloud-based server 230 at a later time as depicted at process step 745. A user can continue-using the on-premises device 214 or may be redirected back to the cloud-based system address. Advantageously, the next time user acting via a client web browser 216 needs to access on-premises device 214 some of the above lookups or security negotiations may be shortened or skipped due to caching of DNS resolution result or TLS session resumption as per relevant standards.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The following definitions and abbreviations are to be used for the interpretation of the claims and the specification. The terminology used herein is for the purpose of describing particular embodiments only and is not intended to be limiting. As used herein, the singular forms "a", "an" and "the" are intended to include the plural forms as well, unless the context clearly indicates otherwise. The terms "a", "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

It will be further understood that the terms "comprises" and/or "comprising," "includes," "including," "has," "having," "contains" or "containing," or any other variation thereof, when used in this specification, specify the presence of stated features, integers, steps, operations, elements, and/or components, but do not preclude the presence or addition of one or more other features, integers, steps, operations, elements, components, and/or groups thereof. The term "exemplary" is used herein to mean "serving as an example, instance, or illustration." Any embodiment or design described herein as "exemplary" is not necessarily to be construed as preferred or advantageous over other embodiments or designs.

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects in accordance with one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A method for mixed-mode cloud/on-premise secure communication, the method comprising:
   commissioning an on-premise device; wherein the commissioning includes;
      generating a set of cryptographic keys,
      connecting to a cloud-based service from a first network address using a name and transmitting on-premise device information to the cloud-based service,
      generating at the cloud-based service a unique name/pseudonym for the on-premise device,
      resolving with an accessible domain name system (DNS) service the unique name/pseudonym to a network address for the cloudbased service and transmitting the unique name to the on-premise device,
      generating with the on-premise device a certificate signing request (CSR) based on the unique name/pseudonym and the cryptographic keys, and transmitting the CSR to the cloud-based service,
      requesting a digital certificate using the CSR from a trusted certification authority (CA) and receiving the digital certificate once the CA issues the digital certificate, and transmitting the digital certificate to the on premise device, and
      configuring the on-premise device to use the digital certificate;
   connecting to a web address via a client web browser using the name and a log in credential of a user;
   verifying the login credential of the user at the cloud-based service and establishing communication with the client web browser if the login credential is authenticated and permitting communication between the client web browser and the cloud based service;
   attempting to connect to the on-premise device with the client web browser to complete a user request;
   cryptographically transmitting from the cloud-based service to the client web browser the information associated with the user relevant to the on-premise device;
   redirecting the client web browser to the network address associated with the unique name/pseudonym employed during the commissioning;
   attempting to connect with the client web browser to the unique name/pseudonym and conducting DNS resolution to resolve and identify an internet protocol (IP) address for the on-premise device if the IP address is not known;
   connecting to the resolved IP address with the client web browser and transmitting information associated with the user relevant to the on-premise device, to the on-premise device;
   transmitting the digital certificate issued to the on-premise device during the commissioning to the client web browser, and cryptographically validating the digital certificate with the client web browser; and
   cryptographically validating data/claims/rights from the information associated with the user relevant to the on-premise device and permitting the user request, if data/claims/rights allow it.

2. The method of claim 1, further including storing information associated with the user relevant to the on-premise device in the client web browser.

3. The method of claim 2, further including the on-premise device requesting the information associated with the user relevant to the on-premise device from the client web browser.

4. The method of claim 1, wherein the information associated with the user relevant to the on-premise device includes at least one of rights, security claims, licensed feature information, user name, expiration dates, and server data.

5. The method of claim 1, wherein the on-premise device is part of at least one of a security system, an access control system, a fire suppression system, an HVAC system or an elevator control system.

6. The method of claim 1, wherein the name is preprogrammed into the on-premise device.

7. The method of claim 1, wherein the certification authority is an independent third party.

8. The method claim 1, wherein the unique name is unique to the service provider.

9. A system for mixed-mode cloud/on-premise secure communication, the system comprising:
   an on-premise device commissioned to provide secure communication with a cloud based system; wherein the commissioning includes;
   wherein the on-premise device generates a set of cryptographic keys,
   a cloud-based service connecting to a first network address using a name and transmitting on-premise device information to the cloud-based service, the cloud based service generating a unique name/pseudonym for the on-premise device,
   a publically available domain name system (DNS) resolving the unique name/pseudonym to a network address for the cloudbased service and transmitting the unique name to the on-premise device,
   wherein the on-premise device generates a certificate signing request (CSR) based on the unique name/pseudonym and the cryptographic keys, and transmits the CSR to the cloud-based service,
   wherein the cloud-based service requests a digital certificate using the CSR from a trusted certification authority (CA) and receives the digital certificate once the CA issues the digital certificate, and transmits the digital certificate to the on-premise device, and
   wherein the on-premise device is configured to use the digital certificate;
   a client web browser connecting to a web address using the name and a log in credential of a user; and wherein the cloud based service verifies the login credential of the user and establishes communication with the client web browser if the login credential is authenticated and permits communication between the client web browser and the cloud based service;

the client web browser attempting to connect to the on-premise device to complete a user request;

the cloud-based service cryptographically transmitting the information associated with the user relevant to the on-premise device to the client web browser;

wherein the client web browser is redirected to the network address associated with the unique name/pseudonym employed during the commissioning;

the client web browser attempting to connect with to the unique name/pseudonym and conducting DNS resolution to resolve and identify an internet protocol (IP) address for the on-premise device if the IP address is not known;

the client web browser connecting to the resolved IP address and transmitting information associated with the user relevant to the on-premise device, to the on-premises device;

the on-premise device transmitting the digital certificate issued during the commissioning to the client web browser, and cryptographically validating the digital certificate with the client web browser; and the on-premise device cryptographically validating data/claims/rights from the information associated with the user relevant to the on-premise device and permitting the user request, if data/claims/rights allow it.

10. The system of claim 9, further including the client web browser storing information associated with the user relevant to the on-premise device.

11. The system of claim 10, further including the on-premise device requesting the information associated with the user relevant to the on-premise device from the client web browser.

12. The system of claim 9, wherein the information associated with the user relevant to the on-premise device includes at least one of rights, security claims, and licensed feature information, user name, expiration dates, and server data.

13. The system of claim 9, wherein the on-premise device is part of at least one of a security system, an access control system, a fire suppression system, an HVAC system or an elevator control system.

14. The system of claim 9, wherein the name is preprogrammed into the on-premise device.

15. The system of claim 9, wherein the certification authority is an independent third party.

16. The system claim 9, wherein the unique name is unique to the service provider.

17. A computer program product to configure mixed-mode cloud/on-premise secure communication, the computer program product comprising a non-transitory computer readable storage medium having program instructions embodied therewith, the program instructions executable by one or more processors to cause the processors to:

commission an on-premise device; wherein the commissioning includes;

generating a set of cryptographic keys, connecting to a cloud-based service from a first network address using a name and transmitting on-premise device information to the cloud-based service, generating at the cloud-based service a unique name/pseudonym for the on-premise device, resolving with a publically accessible cloud-based domain name system (DNS) the unique name/pseudonym to a network address for the cloud-based service and transmitting the unique name to the on-premise device, generating with the on-premise device a certificate signing request (CSR) based on the unique name/pseudonym and the cryptographic keys, and transmitting the CSR to the cloud-based service, requesting a digital certificate using the CSR from a trusted certification authority (CA) and receiving the digital certificate once the CA issues the digital certificate, and transmitting the digital certificate to the on-premise device, and configuring the on-premise device to use the digital certificate;

connect to a web address via a client web browser using the name and a log in credential of a user;

verify the login credential of the user at the cloud-based service and establishing communication with the client web browser if the login credential is authenticated and permit communication between the client web browser and the cloud based service;

attempt to connect to the on-premise device with the client web browser to complete a user request;

cryptographically transmit from the cloud-based service to the client web browser the information associated with the user relevant to the on-premise device;

redirect the client web browser to the network address associated with the unique name/pseudonym employed during the commissioning;

attempt to connect with the client web browser to the unique name/pseudonym and conducting DNS resolution to resolve and identify an internet protocol (IP) address for the on-premise device if the IP address is not known;

connect to the resolved IP address with the client web browser and transmitting information associated with the user relevant to the on-premise device, to the on-premise device;

transmit the digital certificate issued to the on-premise device during the commissioning to the client web browser, and cryptographically validate the digital certificate with the client web browser;

connect to the resolved IP address with the client web browser and transmitting information associated with the user relevant to the on-premise device, to the on-premise device; and cryptographically validate data/claims/rights from the information associated with the user relevant to the on-premise device with on-premises device and permitting the user request, if data/claims/rights allow it.

* * * * *